J. G. CHILDS.

WIND TURBINE.

APPLICATION FILED AUG. 30, 1911.

Reissued Nov. 21, 1911.

13,319.

2 SHEETS—SHEET 1.

Witnesses.

Benton M. Stahl

H. L. Alden

Inventor.

Joseph G. Childs.

By Spear Middleton Donaldson & Spear

Att'ys.

COLUMBIA PLANOGRAPH CO., WASHINGTON, D. C.

J. G. CHILDS.

WIND TURBINE.

APPLICATION FILED AUG. 30, 1911.

Reissued Nov. 21, 1911.

13,319.

2 SHEETS—SHEET 2.

Attest

Benton M. Stahl

H. L. Alden

Inventor.

Joseph G. Childs.

By Spear Middleton Donaldson & Spear

Att'ys.

COLUMBIA PLANOGRAPH CO., WASHINGTON, D. C.

UNITED STATES PATENT OFFICE.

JOSEPH GERSHOM CHILDS, OF WILLESDEN GREEN, LONDON, ENGLAND.

WIND-TURBINE.

13,319. Specification of Reissued Letters Patent. Reissued Nov. 21, 1911.

Original No. 963,359, dated July 5, 1910, Serial No. 542,117. Application for reissue filed August 30, 1911. Serial No. 647,457.

*To all whom it may concern:*

Be it known that I, JOSEPH GERSHOM CHILDS, a subject of the King of Great Britain, residing at Hawthorn Road, Willesden Green, in the county of London, England, electrical engineer, have invented new and useful Improvements in and Relating to Wind-Turbines, of which the following is a specification.

This invention relates to an improved device for controlling the position and operation of a wind turbine or windmill wheel with respect to the direction and velocity of the wind.

Hitherto, as is well known, vanes have been employed which could be rotated by hand or by wind pressure so as to have a different inclination to the plane of the wheel, and thus be caused to set it at a different angle to the wind. It has also been proposed to pivot to the main vane an auxiliary vane normally maintained at a particular angle to the main vane by a weight or spring, but capable of moving to a different inclination under the action of the wind upon itself or upon a third vane mounted on a horizontal pivot on the first vane and linked to the second. It has also been suggested that the blades of the wheel itself should be arranged to turn under the action of centrifugal force, but this arrangement is not good mechanically.

According to the present invention two or more separate vanes are provided, at least one of which is itself pivoted on a horizontal axis, so that the wind pressure upon it can serve directly both to control the position of the wheel and to control the inclination of the vane to the wind. It is obviously desirable that the horizontal axis should pass through the vane, for if the vane were mounted at the end of a long arm extending from the axis, a very large movement of the vane would be necessary to materially alter its inclination.

Figure 1:
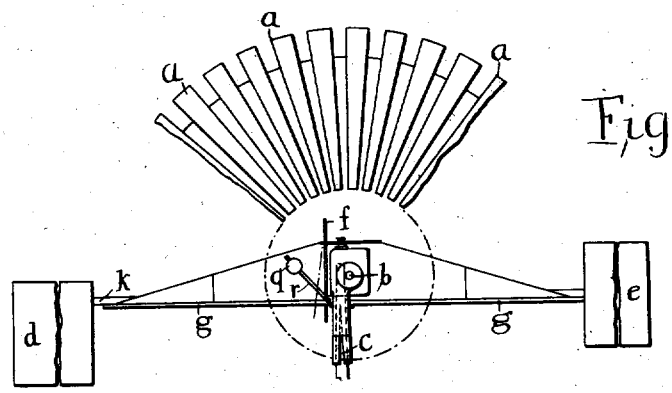
Figure 2:
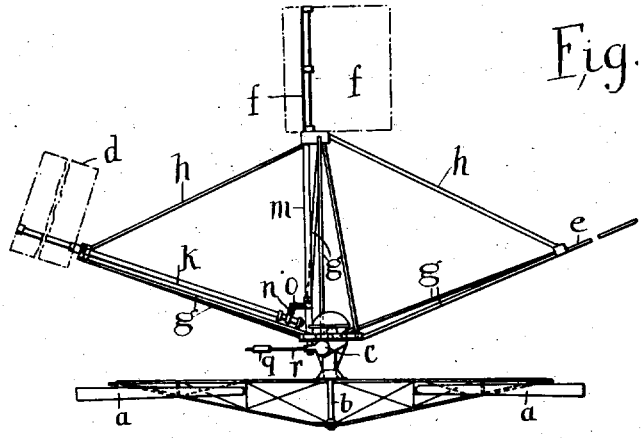
Figure 4:
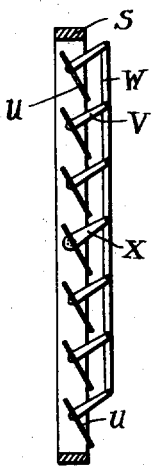
Figure 3:
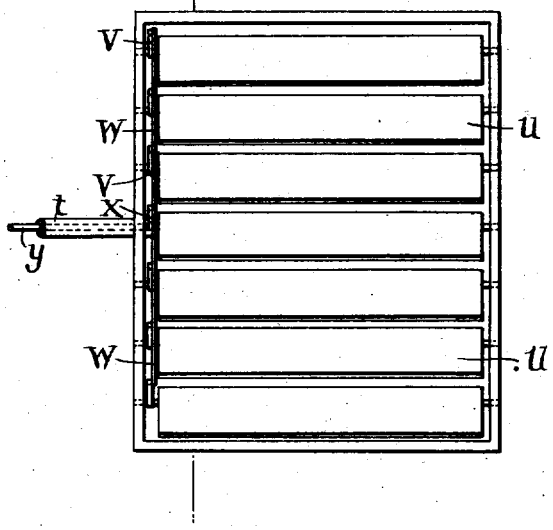

In the accompanying drawings, Figure 1 is an elevation, and Fig. 2 a plan of the head of a turbine to which a preferred form of the invention is applied; Fig. 3 is an elevation, and Fig. 4 a side view of a modified form of vane suitable for the purpose of the invention.

In the form shown in Figs. 1 and 2, the turbine wheel *a* is supported upon its shaft *b* which is a little eccentric to the axis *c* about which the whole head turns. The apparatus for controlling the turbine consists of three vanes, *d*, *e*, *f*, supported on a frame which consists of three pairs of members *g* joined at their outer extremities by rods *h*. This frame is symmetrical with regard to the wheel *a* its outer members being about 140 degrees apart. The vanes *d* and *f* are supported on shafts *k* and *m* which are revoluble in supports attached to the framing and are interconnected at their inner end through suitable gearing, *e. g.* two bevel toothed segments *n*, *o*. As may be seen from the drawing, the vanes are not attached symmetrically to the shaft, but the larger portion of the surface of the weight is beneath the shaft in the case of vane *d*, and above in the case of vane *f*. The vane *e*, on the contrary, is not revoluble, but is rigidly and symmetrically attached to its frame members. To return the revoluble vanes to their vertical position, a weight *q* is provided as is indicated in connection with the vane *f*, which weight may be adjustable upon a crank *r* secured to the shaft (in this case *m*) of the vane. Means are also preferably provided for rotating the shafts *k* and *m* from the bottom of the wind tower, *e. g.* the crank *r* or another on one of the shafts may be turned by means of a cord or rod extending downward from its end.

When all the vanes are hanging vertically the turbine wheel *a* will be set in the most effective position with regard to the wind so as to take full advantage of it. If the wind increases so that the wheel is able to give out more power than can be well absorbed by the machines to which it is connected, the vanes *d* and *f* will be turned by the wind pressure so as to tend to present their edge to the wind. As they are turned more and more the vane *e* will become to a greater and greater extent the sole controlling device; and the position of this vane is such that, acting alone, it will turn the wheel quite out of the wind. By this means the wheel will always set itself at such a position with regard to the wind as not to supply more than a given maximum of power, and so can be left to take care of itself even in the fiercest gales. The weight *q* provides a convenient means of adjusting the degree to which the movable vanes turn for a given wind pressure, because it would be difficult to alter the position of the attachment of the vanes to their shafts. When no power at all is wanted, the wheel can be put completely out of action by hand, with the aid of the crank and cord mentioned.

The vanes *d* and *e* are so designed that the wind pressure on the one counterbalances not only that on the other, but also the torque resulting from the eccentric mounting of the wheel axle, where such mounting is present, or the reaction of the vertical shaft through which power is transmitted.

In some cases, particularly with motors built for large powers, it may be inconvenient or impracticable to construct the vanes in one piece, particularly the moving vanes. In that case the construction illustrated in Figs. 3 and 4 may be adopted, in which the vane consists of a frame *s* mounted upon a shaft or other support *t* and carrying a series of pivoted slats *u* which, when lying in the plane of the frame, present an almost uninterrupted surface. The slats may be pivoted in the frame unsymmetrically after the fashion of the vanes *d* and *f* illustrated in Figs. 1 and 2, and for controlling by hand their axes are provided with cranks *v* joined by a common rod *w* and operated through a crank *x* on a rod *y*, which may suitably pass through the center of the shaft or frame *t*. The advantage of this construction is that a large wheel may be controlled by two comparatively small vanes which protrude on each side of the wheel so as to be freely open to the wind without influence from the wheel, without the necessity of providing a long central tail as is usually done; these two vanes would make an angle on each side of about 20 degrees with the plane of the wheel.

What I claim is:

1. In a wind turbine, the combination with the turbine head and turbine wheel, of a horizontal shaft extending from the turbine head approximately at right angles to the wheel, two supports extending from the turbine head approximately symmetrical about the axis of the wheel, a horizontal shaft in one of said supports, vanes pivoted on the two horizontal shafts, gearing connecting said horizontal shafts, and a vane fixed in the remaining support.

2. In a wind turbine, the combination with the turbine head and turbine wheel, of a horizontal shaft extending from the turbine head approximately at right angles to the wheel, two supports extending from the turbine head approximately symmetrical about the axis of the wheel, a horizontal shaft in one of said supports, vanes pivoted on the two horizontal shafts, gearing connecting said horizontal shafts, a crank and balance weight on one of said shafts, and a vane fixed in the remaining support.

3. A wind wheel having a rearwardly extending central and two diverging regulating vanes, one of said diverging vanes being maintained in a vertical position and the central and other diverging vane being pivoted on horizontal axes, said pivoted diverging vane having means tending to hold it yieldingly against rotation on its horizontal axis, and means connecting said pivoted diverging vane and central vane whereby they are constrained to rotate in unison.

4. A wind wheel having a central and two diverging regulating vanes, one of said diverging vanes being constantly maintained in vertical position, and the central and other diverging vane being pivoted on horizontal axes, one of said pivoted vanes having its major portion below its axis and the other its major portion above its axis, yielding means for acting on one of said pivoted vanes tending to hold it in vertical position, and means connecting said two pivoted vanes whereby they tend to counterbalance each other and are moved in unison.

In testimony whereof I have signed my name to this specification in the presence of two subscribing witnesses.

JOSEPH GERSHOM CHILDS.

Witnesses:

FELIX V. KING,

GEO. PHELPS.

Copies of this patent may be obtained for five cents each, by addressing the "Commissioner of Patents, Washington, D. C."